United States Patent [19]

Severinsson

[11] Patent Number: 5,388,674
[45] Date of Patent: Feb. 14, 1995

[54] DEVICE IN A BRAKE UNIT

[75] Inventor: Lars Severinsson, Hishult, Sweden

[73] Assignee: SAB WABCO Holdings B.V., Heerhugowaard, Netherlands

[21] Appl. No.: 119,130

[22] PCT Filed: Mar. 31, 1992

[86] PCT No.: PCT/SE92/00201
§ 371 Date: Sep. 24, 1993
§ 102(e) Date: Sep. 24, 1993

[87] PCT Pub. No.: WO92/17714
PCT Pub. Date: Oct. 15, 1992

[30] Foreign Application Priority Data

Apr. 8, 1991 [SE] Sweden .................. 9101024

[51] Int. Cl.6 ................. B60T 13/04; B60L 7/00
[52] U.S. Cl. ..................... 188/171; 188/162
[58] Field of Search .......... 188/171, 151 A, 82.3, 188/162, 82.5; 192/12 BA

[56] References Cited

U.S. PATENT DOCUMENTS

| 2,529,490 | 11/1950 | Field | 318/212 |
|---|---|---|---|
| 3,698,520 | 10/1972 | McClure | 188/171 |
| 4,546,297 | 10/1985 | Washbourn et al. | 188/162 X |
| 4,953,668 | 9/1990 | Severinsson | 188/171 X |
| 4,953,669 | 9/1990 | Severinsson | 188/171 |

FOREIGN PATENT DOCUMENTS

| 334434 | 9/1989 | European Pat. Off. | 188/162 |
|---|---|---|---|
| 113135 | 4/1990 | Japan | 188/162 |

Primary Examiner—Robert J. Oberleitner
Assistant Examiner—Kevin D. Rutherford
Attorney, Agent, or Firm—Laurence R. Brown

[57] ABSTRACT

An electromechanical brake unit in a housing (1) is provided with a drive sleeve (8) subjected to a torque of a prestressed coil spring (6), a locking spring (16) between the drive sleeve and the housing for permitting rotation of the former in a first direction, and a control sleeve (17), which is rotatable by a control motor (20) in the first direction to open the locking spring and allow the drive sleeve to rotate the same angular distance as the control sleeve. In order to obtain rotary force transmission from the drive sleeve (8) over the locking spring (16), if the control sleeve (17) is not held against rotation, the locking spring has a slightly smaller external rest diameter than the bore in the housing (1), with which it is to cooperate, whereas the control motor (20) is provided with means to hold it against rotation in its rest position, unless the current supply is broken.

3 Claims, 1 Drawing Sheet

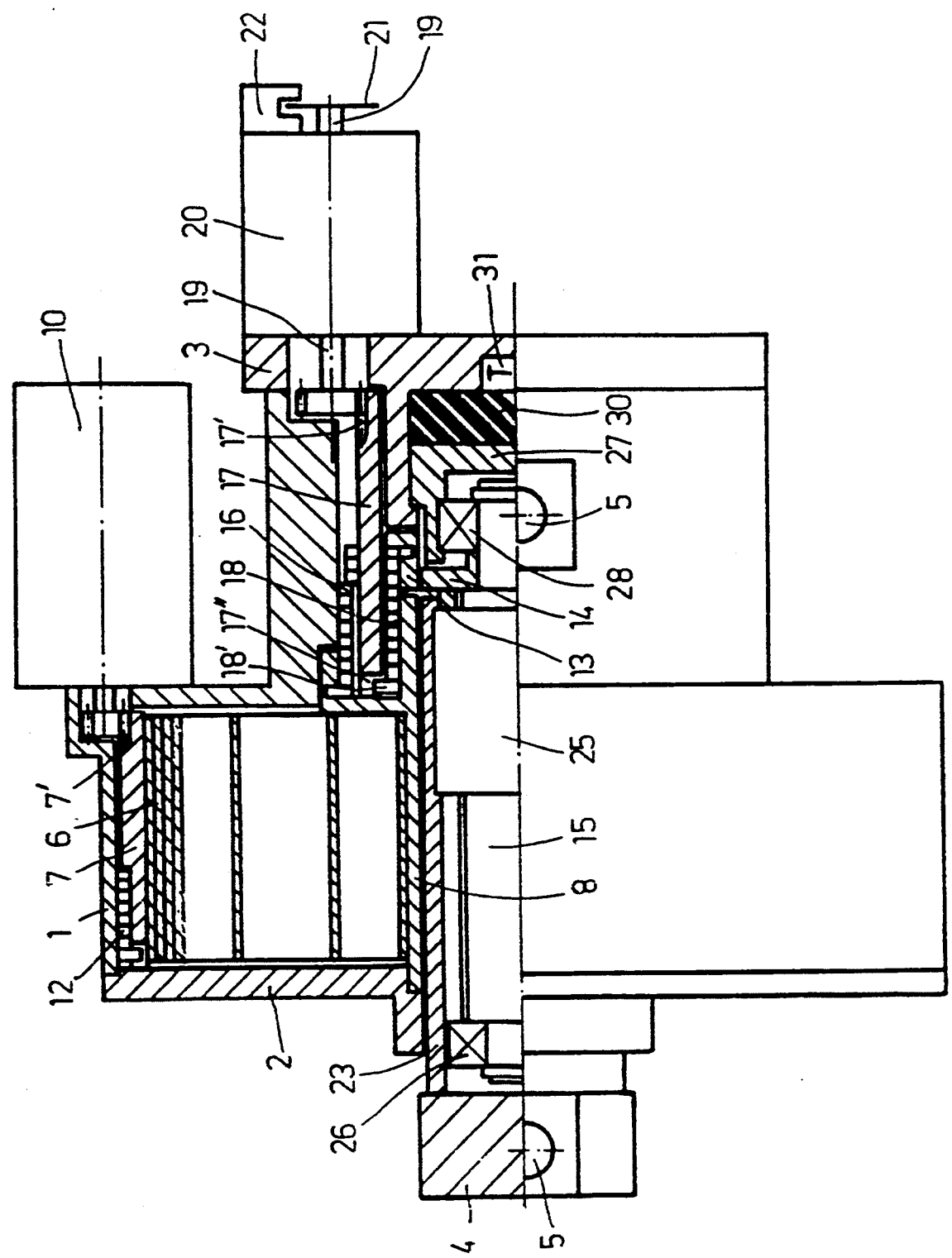

DEVICE IN A BRAKE UNIT

TECHNICAL FIELD

This invention relates to a brake unit—preferably but not exclusively for a rail vehicle—including a housing, a drive sleeve subjected to a torque of a prestressed coil spring, a locking spring between the drive sleeve, to which it is attached, and the housing for permitting rotation of the former in a first direction, and a control sleeve, which is rotatable by a control motor in the first direction to open the locking spring, connected to the control sleeve with one end, and allow the drive sleeve concentric therewith to rotate the same angular distance as the control sleeve.

BACKGROUND OF THE INVENTION

A brake unit of this kind, where the, coil spring is "loaded" by an electric motor and there is a further locking spring and a ball screw arrangement to transform the rotary motion into an axial movement, is shown and described in our EP-A-0 334 434. This electro-mechanical brake unit, in which both the brake energy and the control signal are supplied in electric form, has great advantages over both more conventional brake units, which are pneumatically supplied and controlled, and earlier attempts with electro-mechanical brake units.

However, the electro-mechanical brake unit as shown and described in EP-A-0 334 434 has the characteristic that a current supply to the control motor therein is required to obtain brake application under the action of the prestressed coil spring. This means that the brake unit does not have the safety feature with automatic brake application at the loss of the control current supply, which in this case thus is electric.

In certain instances it is a prerequisite with this feature, which in pneumatic installations often is obtained by means of a so called spring brake actuator. The feature does not only provide the necessary safety at the loss of the control current supply, but it may also give a simple and effective way of obtaining a parking brake.

THE INVENTION

In an electro-mechanical brake unit of the kind described above the desired safety and parking brake feature may according to the invention be attained in that the locking spring has a slightly smaller external rest diameter than the bore in the housing, with which it is to cooperate, but normally is held in engagement with the bore by the torque from the drive sleeve, and in that the control motor is provided with means to hold it against rotation in its rest position, unless the current supply is broken.

The preferred way of obtaining the feature with the holding of the control motor against rotation in its rest position is that the motor is provided with an electrically controlled brake, preferably an electro-magnetic brake.

Alternatively, the control motor can be held against rotation by means of a certain current supply to its windings.

BRIEF DESCRIPTION OF THE DRAWING

The invention will be described in further detail below reference being made to the accompanying drawing, which in a side view, partly in section, shows an actuator, namely an electro-mechanical brake unit, according to the invention.

DETAILED DESCRIPTION OF A PREFERRED EMBODIMENT

An actuator or electro-mechanical brake unit according to the invention is basically the same as is described in EP-A-0 334 434.

A relatively brief description of the overall design is therefore given here, and reference is made to the earlier publication. Emphasis is put on the improvement afforded by the present invention.

The electro-mechanical brake unit has a housing 1 with lids 2 and 3. The unit is also provided with a force transmitting member 4, axially movable in relation to the housing 1. The housing 1 and the member 4 are provided with attachments 5 for the mounting of the unit, for example in a conventional disc brake caliper of a rail vehicle.

A powerful coil spring or clock spring 6 is arranged in the housing 1. The outer end of the spring 6 is anchored to a rotatable motor sleeve 7 and its inner end to a rotatable drive sleeve 8, which is journalled in the housing 1.

An electric motor 10, attached to the housing 1, is drivingly connected to a gear ring 7' on the motor sleeve 7. A locking spring 12 enables the motor sleeve 7 only to be rotated in the direction for tightening the coil spring 6.

Coaxial with the drive sleeve 8 is a rotatable drive ring 13 in splined engagement with a spindle ring 14, which is attached to a rotatable spindle 15.

A rotary force transmission between the drive sleeve 8 and the drive ring 13 is performed by means of an arrangement consisting of three concentric members, namely an outer locking spring 16, a control sleeve 17, and an inner locking spring 18.

The outer end of the control sleeve 17 is provided with a gear ring 17' in engagement with corresponding gears on the rotary motor shaft 19 of an electric control motor 20 attached to the lid 3. The shaft 19 of the motor 20 is provided with a disc 21 cooperating with a fixed yoke 22. The disc 21 has circumferential holes for counting by the yoke 22 and thereby control of the rotation of the control motor 20.

A force transmitting sleeve 23 is attached to the force transmitting member 4. A ball nut 25, which together with the spindle 15 forms a ball screw, is non-rotatably attached to the force transmitting sleeve 23. The spindle 15 is journalled in the force transmitting sleeve 23 by means of a radial ball bearing 26 and in a force sensing cup 27 by means of a ball bearing 28.

An elastic disc 30 is confined between the force sensing cup 27 and the lid 3. A pressure transducer 31 is arranged in the lid 3 in contact with the elastic disc 30.

The interaction between the different parts, especially the two locking springs 16 and 18 and the control sleeve 17, is now to be described.

The outer locking spring 16, which can also be called an application spring for reasons apparent below, serves to prevent the drive sleeve 8 from rotating relative to the housing 1 in one direction, and its left hand end is locked to the drive sleeve 8. In the prior device according to EP-A-0 334 434 the major part of the spring 16 is arranged with its outer surface in contact with coaxial cylindrical inner surfaces of the sleeve 8 and the housing 1, which in other words means that the rest diameter of the spring is larger than the diameter of said inner surfaces. In the new device the spring 16 has a rest diameter which is slightly smaller than the diameter of said inner surfaces and will accordingly not be in contact with the housing 1, provided that no external torque is applied to it. A few turns of the locking spring 16 has a smaller diameter and are with its inner surface in engagement with the outer surface of the cylindrical control sleeve 17.

The inner locking spring 18, which can also be called a release spring, serves to transmit rotational movement in one direction between the drive sleeve 8 and the drive ring 13 but also establishes a means for transmitting rotational movement in the other direction between the control sleeve 17 and the drive ring 13. The inner surface of the locking spring 18 is in contact with coaxial cylindrical outer surfaces of the drive sleeve 8 and the drive ring 13. The right hand end of the spring 18 is locked to the drive ring 13, whereas its left hand end is provided with an upwardly projecting end 18' engaging an axial projection 17" at the left hand end of the control sleeve 17. In order to protect the control motor 20, the spring 18 may—as an alternative to being provided with the projecting end 8'—have a few turns to the left with a larger diameter engaging the control sleeve 17.

The function of the arrangement so far described is as follows: Assuming that the coil spring 6 is tensioned or wound up by the electric motor 10 and backwards rotation of the latter is prevented by the one-way coupling 12, the drive sleeve 8 is subjected to a large torque in one rotational direction. Provided that the control sleeve 17 is held against rotation by means in or at the control motor 20, this rotational movement will increase the diameter of the application spring 16, so that the sleeve 8 is locked against rotation in this direction by the spring.

By turning the control sleeve 17 (by means of the control motor 20) it is, however, possible to "open" the application spring 16, i.e. to turn it in the direction opposite the locking direction, by means of the spring turns in engagement with the control sleeve 17. Hereby the drive sleeve 8 will be free to turn under the action of the coil spring 6 until the application spring 16 again locks the sleeve 8 to the housing 1. The turning movement of the drive sleeve 8 corresponds in other words to that of the control sleeve 17. During this turning movement the inner locking spring 18—due to its locking direction—transmits the turning movement and the torque to the drive ring 13.

The torque transmitted to the drive ring 13 is transferred through the ball screw spindle 15 to an axial force in the ball nut 25, the force transmitting sleeve 23 and the force transmitting member 4. The application stroke or movement is to the left in the drawing.

The drive sleeve 8 can rotate (for transmitting its torque to the drive ring 13 via the inner locking spring 18) when and to the extent the control sleeve 17 is rotated by the control motor 20 in the unlocking direction for the application spring 16 but also—due to the fact that the application spring 16 is not in contact with the housing 1 in its rest position—when the control motor 20 is not held against rotation.

As has appeared, the control motor 20 serves to control the application stroke (but also the release stroke). However, if the control motor is not positively held against rotation or rotated under control, a torque from the drive sleeve 8 will be transmitted through the application spring 16, which is hereby not in locking contact with the housing 1. The purpose of this design is to accomplish the safety feature that an application stroke occurs if the current supply to the control motor 20 is broken for any reason. A simple parking brake feature is also obtained.

There are at least two alternatives for preventing the control motor shaft 19 from rotating, namely either to provide the control motor 20 with an electro-magnetic brake (which is released at the lack of current supply) or to supply the motor windings with a holding current in a rest position.

The release stroke or movement of the force transmitting member 4 and sleeve 23 to the right in the drawing is properly described in EP-A-0 334 434, to which reference is made. The release stroke is not affected in principle by the modification of the application spring 16 and the function of the control motor 20.

As an alternative to drive sleeve control by means of a motor, it is possible to obtain the same result by means of electro-magnets. In such a case the relevant electro-magnet is kept in its sleeve holding position, unless the current supply is broken. This alternative is intended to be covered by the language of the main claim.

I claim:

1. In a brake unit, including a housing (1), a drive sleeve (8) subjected to a torque of a prestressed coil sleeve (6), a locking spring (16) positioned in a bore in housing (1) between the drive sleeve, to which it is attached, and the housing for permitting rotation of the former in a first direction, and a control sleeve (17), which is rotatable by an electric control motor (20) having a current supply thereto in the first direction to open the locking spring, connected to the control sleeve with one end, and allow the drive sleeve concentric therewith to rotate the same angular distance as the control sleeve, the improvement providing for automatic application of the brakes in the event that drive current to the control motor (20) is interrupted, comprising in combination: said locking spring (16) being provided with a slightly smaller external rest diameter than the bore in the housing (1) normally held in engagement with the bore by the torque from the drive sleeve (8), and wherein the control motor (20) is provided with means comprising said locking spring (16) rest diameter to hold the spring (16) locked in engagement with said bore in said normal position, and to return the locking spring (16) to its rest diameter when the central motor current supply is broken whereby the brakes are applied.

2. A brake unit according to claim 1, wherein the control motor (20) comprises an electro-magnet.

3. A brake unit according to claim 1, wherein the control motor (20) is held against rotation in a rest position by means of normally unbroken current from said current supply.

* * * * *